United States Patent
Schmalenberg et al.

(10) Patent No.: US 11,773,518 B2
(45) Date of Patent: Oct. 3, 2023

(54) OBJECT DETECTION BY INDEXED OPTICAL FIBER FABRICS

(71) Applicant: Toyota Motor Engineering & Manufacturing North America, Inc., Plano, TX (US)

(72) Inventors: Paul Schmalenberg, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 638 days.

(21) Appl. No.: 16/778,838

(22) Filed: Jan. 31, 2020

(65) Prior Publication Data

US 2021/0238777 A1    Aug. 5, 2021

(51) Int. Cl.
*D03D 15/267* (2021.01)
*B60R 21/015* (2006.01)

(52) U.S. Cl.
CPC ..... *D03D 15/267* (2021.01); *B60R 21/01538* (2014.10); *D10B 2101/06* (2013.01)

(58) Field of Classification Search
None
See application file for complete search history.

(56) References Cited

U.S. PATENT DOCUMENTS

| | | | |
|---|---|---|---|
| 7,043,997 B2 | 5/2006 | Mattson et al. | |
| 2008/0234898 A1* | 9/2008 | Wiener | G01G 19/4142 385/13 |

FOREIGN PATENT DOCUMENTS

| | | |
|---|---|---|
| DE | 10045689 A1 | 5/2001 |
| DE | 102004024691 A1 | 2/2006 |
| DE | 102012013550 A1 | 1/2013 |
| KR | 20100113375 A | 10/2010 |
| WO | 200214100 A1 | 2/2002 |
| WO | WO2010017992 * | 2/2010 |

OTHER PUBLICATIONS

Machine translation of WO2010017992 (Year: 2010).*
"Automotive fiber: Plastic optical fiber builds on MOST success", Laser Focus World, Mar. 1, 2006.
(Continued)

*Primary Examiner* — Shawn Mckinnon
(74) *Attorney, Agent, or Firm* — DINSMORE & SHOHL LLP (57) ABSTRACT

An apparatus comprises a first plurality of optical fibers embedded in a first plurality of fabric strands, a second plurality of optical fibers embedded in a second plurality of fabric strands, and a detector. The first plurality of optical fibers are positioned adjacent to each other and oriented along a first direction and the second plurality of optical fibers are positioned adjacent to each other and oriented along a second direction orthogonal to the first direction. The first and second plurality of optical fibers are configured to receive ambient light emitted onto them. The detector detects the light received into at least some of the first and second plurality of optical fibers and creates data configured to be processed to identify an object adjacent to the apparatus. The data is based on the light received into the first plurality of optical fibers and the second plurality of optical fibers.

17 Claims, 7 Drawing Sheets

(56) References Cited

OTHER PUBLICATIONS

"Sensing mat platform by Sensing Tex", Nov. 4, 2019; URL: http://sensingtex.com/.
Kim, G. et al., "Computational imaging enables a "see-through" lens-less camera", Optics Express, Sep. 3, 2018, p. 22826-22836, vol. 26, No. 18.

* cited by examiner

OBJECT DETECTION BY INDEXED OPTICAL FIBER FABRICS

TECHNICAL FIELD

The present specification generally relates to an apparatus for detecting objects and, more specifically, to systems and apparatus for performing object detection by indexed optical fiber fabrics.

BACKGROUND

Detection of people and/or objects is important in a variety of applications such as in vehicles, homes, commercial buildings, and other settings. Such detection may be useful to increase safety, security, or other factors. Detection of people and/or objects may be performed by cameras or other sensors, however such cameras or sensors may be obtrusive in certain environments. Accordingly, a need exists for alternative systems and apparatus for object detection.

SUMMARY

In one embodiment, an apparatus may include a first plurality of optical fibers embedded in a first plurality of fabric strands, a second plurality of optical fibers embedded in a second plurality of fabric strands, and a detector. The first plurality of optical fibers may be positioned adjacent to each other and oriented along a first direction. The first plurality of optical fibers may be configured to receive ambient light emitted onto the first plurality of optical fibers. The second plurality of optical fibers may be positioned adjacent to each other and oriented along a second direction transverse to the first direction. The second plurality of optical fibers may be configured to receive ambient light emitted onto the second plurality of optical fibers. The detector may detect the light received into at least some of the first plurality of optical fibers and into at least some of the second plurality of optical fibers. The detector may create data configured to be processed to identify an object adjacent to the apparatus. The data may be based on the light received into the first plurality of optical fibers and the light received into the second plurality of optical fibers.

In another embodiment, an object detection apparatus may comprise a first plurality of optical fibers embedded in a first plurality of fabric strands, a second plurality of optical fibers embedded in a second plurality of fabric strands, a detector, a processor, one or more memory modules, and machine readable instructions stored in the one or more memory modules. The first plurality of optical fibers may be positioned adjacent to each other and oriented along a first direction. The first plurality of optical fibers may be configured to receive ambient light emitted onto the first plurality of optical fibers. The second plurality of optical fibers may be positioned adjacent to each other and oriented along a second direction transverse to the first direction. The second plurality of optical fibers may be configured to receive ambient light emitted onto the second plurality of optical fibers. The detector may detect the light received into at least some of the first plurality of optical fibers and into at least some of the second plurality of optical fibers. The machine readable instructions, when executed by the processor, may cause the processor to identify an object adjacent to the apparatus based on the light received into the first plurality of optical fibers and the light received into the second plurality of optical fibers.

In another embodiment, a vehicle may comprise a first plurality of optical fibers embedded in a surface of the vehicle, a second plurality of optical fibers embedded in the surface of the vehicle, a detector, a processor, one or more memory modules, and machine readable instructions stored in the one or more memory modules. The first plurality of optical fibers may be positioned adjacent to each other and oriented along a first direction. The first plurality of optical fibers may be configured to receive ambient light emitted onto the first plurality of optical fibers. The second plurality of optical fibers may be positioned adjacent to each other and oriented along a second direction transverse to the first direction. The second plurality of optical fibers may be configured to receive ambient light emitted onto the second plurality of optical fibers. The detector may detect the light received into at least some of the first plurality of optical fibers and into at least some of the second plurality of optical fibers. The machine readable instructions, when executed, may cause the processor to identify an object within the vehicle and to do limited image reconstruction based on the light received into the first plurality of optical fibers and the light received into the second plurality of optical fibers.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

An optical fiber may have an internal core and an external cladding with different indexes of refraction such that light stays within the core due to the principle of total internal reflection. Thus, optical fibers may be used to transmit light over a large distance. In addition, the core of an optical fiber may have a Bragg grating that allows light at certain wavelengths to pass through the Bragg grating and be received into the fiber. Once external light is received into an optical fiber, the light may travel along the length of the fiber, while being prevented from leaving the fiber due to total internal reflection. An end of an optical fiber may be connected to an optical detector. Thus, the optical detector may detect light that illuminates the optical fiber, enters the optical fiber, and traverses to the detector.

Optical fibers may be embedded in a variety of fabrics, such as curtains, clothing, or vehicle upholstery. When these fibers are connected to an optical detector, the detector may detect when light enters the fabric in which the fibers are embedded. Furthermore, a plurality of fibers may be embedded in fabric in a two-dimensional grid pattern to create an array of pixels where the fibers cross each other. If each fiber is then connected to a detector, the detector may detect when light is received into one or more pixels of the array of pixels in the fabric.

If a person or object is positioned adjacent to such a fabric containing a two-dimensional array of embedded optical fibers, the person or object may block, reflect, or otherwise change the light that is emitted onto the array of optical fibers. The particular arrangement of pixels that are so affected may change depending on the size and/or shape of the person or object. Thus, with proper analysis, the detector may be able to identify the person or object that caused the particular pattern of pixel illumination on the fabric. In particular, a machine learning algorithm may be used to analyze the data captured by the detector.

Figure 1:
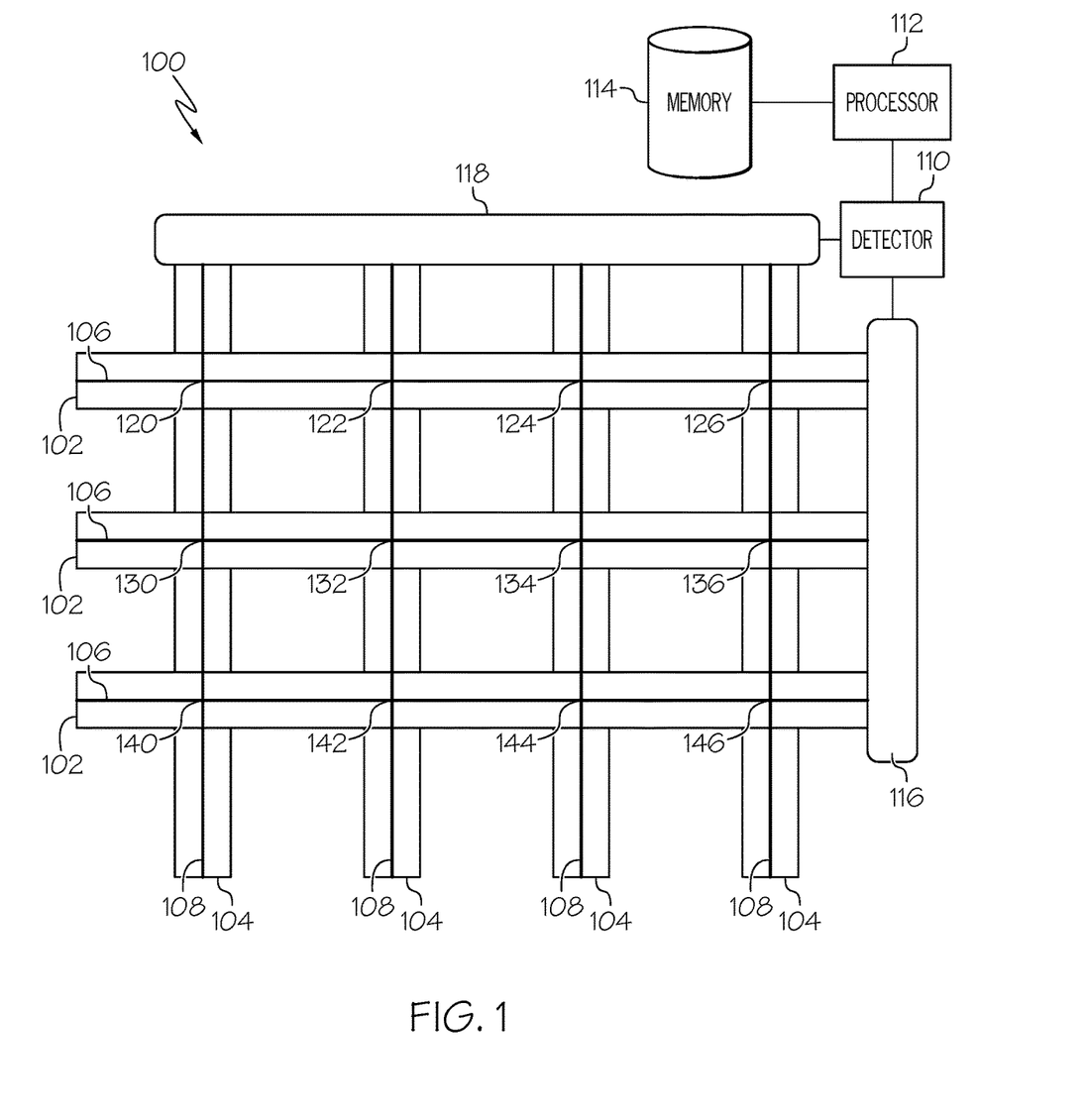
FIG. 1 schematically depicts an example object detection apparatus according to one or more embodiments shown or described herein.

FIG. 1 generally depicts an example object detection apparatus. The object detection apparatus of FIG. 1 comprises a plurality of fabric strands and one or more optical fibers embedded in the one or more fabric strands. The fabric strands may be embedded or sewn into a variety of objects such as curtains, clothing, chairs, couches, vehicle upholstery, among others. A first set of optical fibers are embedded into the fabric adjacent to each other in a horizontal direction and a second set of optical fibers are embedded into the fabric adjacent to each other in a vertical direction, thereby creating a two-dimensional grid of pixels where the fibers overlap.

The optical fibers are at least partially transparent to light at one or more wavelengths such that when light having an appropriate wavelength is emitted onto a fiber, the light enters the fiber and travels along the length of the fiber to a detector, which is optically coupled to the end of each fiber. Thus, the detector is able to detect when light is received into any of the fibers of the apparatus. By simultaneously detecting when light is emitted into and received by the horizontal fibers and the vertical fibers, the detector may detect which pixel in the grid of pixels created by the optical fibers are illuminated at any given time.

As an object is positioned in front of the apparatus of FIG. 1, the object may block one or more pixels from being fully illuminated, cause light to reflect off the object onto one or more pixels, or otherwise change the intensity of light that illuminates one or more pixels of the two-dimensional grid of pixels. The particular arrangement of pixels that are illuminated more or less because of the presence of the object may depend on the size and shape of the object. Thus, by detecting the intensity of illumination of each of the pixels and/or the pattern of light made by each of the pixels when an object is positioned in front of the apparatus, the detector may identify the object based on the pixels that are illuminated. In particular, a machine learning algorithm may be used by the detector to identify the object, as disclosed herein.

Referring now to FIG. 1, an example object detection apparatus 100 is illustrated. The object detection apparatus 100 generally comprises a plurality of horizontal fabric strands 102 and a plurality of vertical fabric strands 104. Although the fabric strands 102, 104 of the object detection apparatus 100 of FIG. 1 are referred to as horizontal and vertical fabric strands, it should be understood that the fabric strands 102, 104 may be oriented in any direction such that the fabric strands 102 are oriented in a direction transverse (e.g., orthogonal) to the fabric strands 104. In addition, while three horizontal fabric strands 102 and four vertical fabric strands 104 are illustrated in FIG. 1, it should be understood that the object detection apparatus 100 may comprise any number of horizontal fabric strands 102 and any number of vertical fabric strands 104.

The fabric strands 102, 104 may comprise any type of flexible material in which optical fibers may be embedded. In some examples, the fabric strands 102, 104 are embedded into a carrier fabric such as curtains, clothing, furniture, or vehicle upholstery. As such, the object detection apparatus 100 may be embedded in such objects. For example, the object detection apparatus 100 may be embedded in a curtain such that objects may be detected as they move past the curtain, as discussed in further detail below. In the illustrated example, the spacing between the horizontal fabric strands 102 and the spacing between the vertical fabric strands 104 may be between 100 µm and 5 mm.

Referring still to FIG. 1, horizontal optical fibers 106 are embedded in the horizontal fabric strands 102 and vertical optical fibers 108 are embedded in the vertical fabric strands 104. While the optical fibers 106, 108 are referred to herein as horizontal optical fibers and vertical optical fibers, it should be understood that the optical fibers 106, 108 may be oriented in any direction such that horizontal optical fibers 106 are oriented in a direction transverse to the vertical optical fibers 108. In the example of FIG. 1, each fabric strand 102, 104 contains an embedded optical fiber. In other examples, one or more of the fabric strands 102, 104 may not contain an embedded optical fiber.

By orienting the horizontal optical fibers 106 transverse to the vertical optical fibers 108, the optical fibers 106, 108 together define a two-dimensional array or grid of pixels where each pixel is defined by a point where a horizontal optical fiber 106 crosses over or under a vertical optical fiber. In the example of FIG. 1, the uppermost horizontal optical fiber 106 defines pixels 120, 122, 124, 126 with the vertical optical fibers 108, the middle horizontal optical fiber 106 defines pixels 130, 132, 134, 136 with the vertical optical fibers 108, and the lowermost horizontal fiber 106 defines pixels 140, 142, 144, 146 with the vertical optical fibers 108.

Thus, as light is emitted onto the object detection apparatus 100, one or more pixels 120, 122, 124, 126, 130, 132, 134, 136, 140, 142, 144 146 may be illuminated at a variety of intensities or patterns. If an object is positioned in front of the object detection apparatus 100, the intensity of light emission onto one or more of the pixels may be changed (e.g., due to the object blocking some of the pixels or causing reflected light to illuminate some of the pixels) as compared to the intensity of light emission onto the one or more pixels in the absence of the object. Accordingly, detection of which pixels are illuminated and the intensity of such illumination when an object is in front of the apparatus may allow the object to be identified, as explained in further detail below.

The resolution of the object detection apparatus depends on the distance between the horizontal optical fibers 106 and the vertical optical fibers 108, which corresponds to the spacing between the pixels of the pixel array. Thus, the smaller the spacing between adjacent optical fibers 106, 108, the greater the resolution of the object detection apparatus 100 will be for an object at a fixed distance away.

Figure 4:
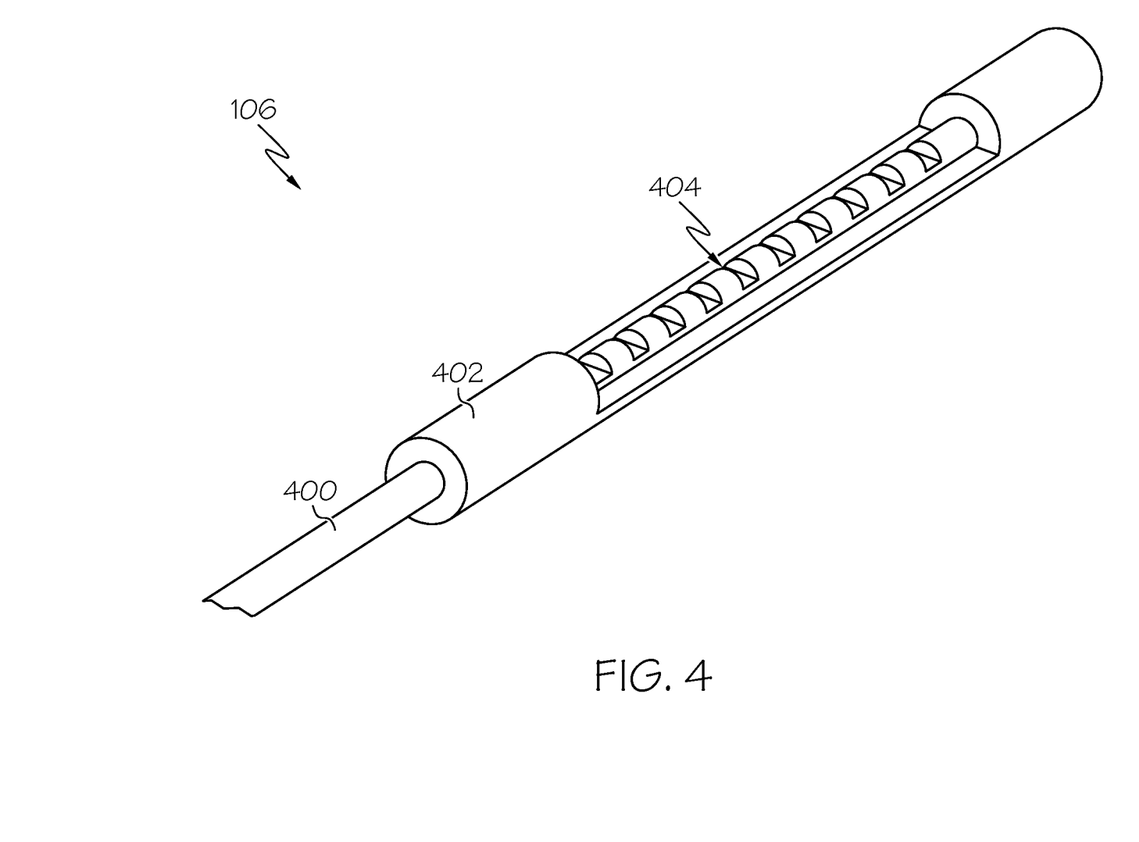
FIG. 4 depicts an example optical fiber of the object detection apparatuses of FIGS. 1-3.

Referring now to FIG. 4, a portion of an exemplary horizontal optical fiber 106 is shown that may be embedded within a fabric strand 102, 104 of the object detection apparatus 100. Although FIG. 4 shows an exemplary horizontal optical fiber 106, it should be understood that the vertical optical fibers 108 may be constructed similarly to the horizontal optical fibers 106. The horizontal optical fiber 106 comprises a fiber core 400 and a fiber cladding 402. For purposes of illustration, only a portion of the fiber cladding 402 is shown in FIG. 4 in order to illustrate a portion of the fiber core 400 within the fiber cladding 402. However, it should be understood that the fiber cladding 402 may extend along the length of the fiber core 400 or a continuous portion thereof. The fiber cladding 402 has a lower index of refraction than the fiber core 400 such that light traveling within the fiber core 400 remains within the core due to total internal reflection and thus propagates along the length of the horizontal optical fiber 106. The fiber cladding 402 is configured such that light at one or more wavelengths impinging on an outer surface of the fiber cladding 402 passes through the cladding and enters the fiber core 400, allowing the horizontal optical fiber 106 to thereby receive the impinging light. Once light is received by the horizontal optical fiber 106, the light may propagate within the fiber core 400 along the length of the horizontal optical fiber 106.

Still referring to FIG. 4, a portion of the fiber core 400 may comprise a Bragg grating 404. The Bragg grating 404 may comprise a region of the fiber core 400 having a periodic variation in refractive index. The period of the Bragg grating 404 may be varied by design or pseudo randomly to accept light at only certain wavelengths. As such, only certain wavelengths of light are received by the horizontal optical fiber 106 (e.g., only visible light or only infrared light). Accordingly, the Bragg grating 404 may act as an optical filter. In other examples, the Bragg grating 404 may be configured to only allow light impinging on the horizontal optical fiber 106 at certain angles of incidence to pass through the Bragg grating 404. In the illustrated example, the diameter of the fiber core 400 is on the order of micrometers and the period of the Bragg grating 404 may be from hundreds of nanometers to some number of micrometers. Applications of the Bragg grating 404 are discussed in further detail below.

Referring back to FIG. 1, the example object detection apparatus 100 further comprises a detector 110. The detector 110 may detect light that is received into the optical fibers 106, 108, as explained in further detail below. In the illustrated example of FIG. 1, the detector 110 is positioned adjacent to the fabric strands 102, 104. In examples where the fabric strands 102, 104 are embedded in a carrier fabric, the detector 110 may also be embedded in the carrier fabric. Alternatively, in other examples where the fabric strands 102, 104 are embedded in a carrier fabric, the detector 110 may be connected to the outside of the carrier fabric or may be a standalone device not physically connected to the carrier fabric or the fabric strands 102, 104. In an example where the object detection apparatus 100 is embedded in a curtain, the detector 110 may be attached to a side of the curtain.

In the example of FIG. 1, a first optical router 116 is connected to the ends of the horizontal optical fibers 106 and a second optical router 118 is connected to the ends of the vertical optical fibers 108 such that light that travels through the optical fibers 106, 108 reaches the optical routers 116, 118, respectively. The optical routers 116, 118 then route light from the ends of the optical fibers 106, 108 to the detector 110 to optically couple the optical fibers 106, 108 to the detector 110. Thus, when any of the optical fibers 106, 108 are illuminated, the illuminated fibers send an optical signal to the detector 110. The detector 110 then determines the amplitude of the optical signal received from each of the optical fibers 106, 108.

After the detector 110 detects the amplitude of the optical signal received from each of the optical fibers 106, 108, the detector 110 creates data based on these amplitudes and outputs this data to a processor 112. In one example, the data output by the detector 110 comprises a voltage corresponding to the amplitude of optical signal received from each of the optical fibers 106, 108. In other examples, the data output by the detector 110 comprises a digital signal indicating the amplitude of the optical signal received from each of the optical fibers 106, 108.

After the processor 112 receives the data output by the detector 11 indicating the amplitude of the optical signal received from each of the optical fibers 106, 108, the processor 112 is able to use this information to determine the intensity of light that illuminated each of the pixels of the object detection apparatus 100. For example, if the detector 110 detects an optical signal from the uppermost horizontal optical fiber 106 of FIG. 1 at a time t1 and the detector 110 detects an optical signal from the rightmost vertical optical fiber 108 at the same time t1, then the processor 112 may determine that the pixel 126, defined by the intersection of the uppermost horizontal optical fiber 106 and the rightmost vertical optical fiber 108 was illuminated at time t1. In some examples, the processor 112 may set a minimum threshold that an amplitude of an optical signal must reach before determining that a pixel was illuminated. That is, if the detector 110 detects an optical signal having an amplitude below the threshold, the processor 112 may ignore the optical signal.

Referring still to FIG. 1, the object detection apparatus 100 also comprises one or more memory modules 114 coupled to the processor 112. The one or more memory modules 114 may comprise RAM, ROM, flash memories, hard drives, or any device capable of storing machine readable and executable instructions such that the machine readable and executable instructions can be accessed by the processor 112. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 114. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more memory modules 114 may store instructions to cause the processor 112 to determine the intensity of light illuminating each of the pixels of the object detection apparatus 100 after receiving the data from the detector 110 regarding amplitudes of optical signals received from the optical fibers 106, 108, as discussed above. In addition, the one or more memory modules 114 may store instructions for implementing a machine learning algorithm, as discussed in further detail below. In some examples, the processor 112 and/or the memory modules 114 may be part of the detector 110 rather than separate components. In other examples, the processor 112 and/or the memory modules 114 may not be part of the object detection apparatus 100 but may instead be remote components (e.g., cloud computing services) that the object detection apparatus 100 may transmit and receive data to and from (e.g., via Wi-Fi, Bluetooth®, and the like).

Figure 2:
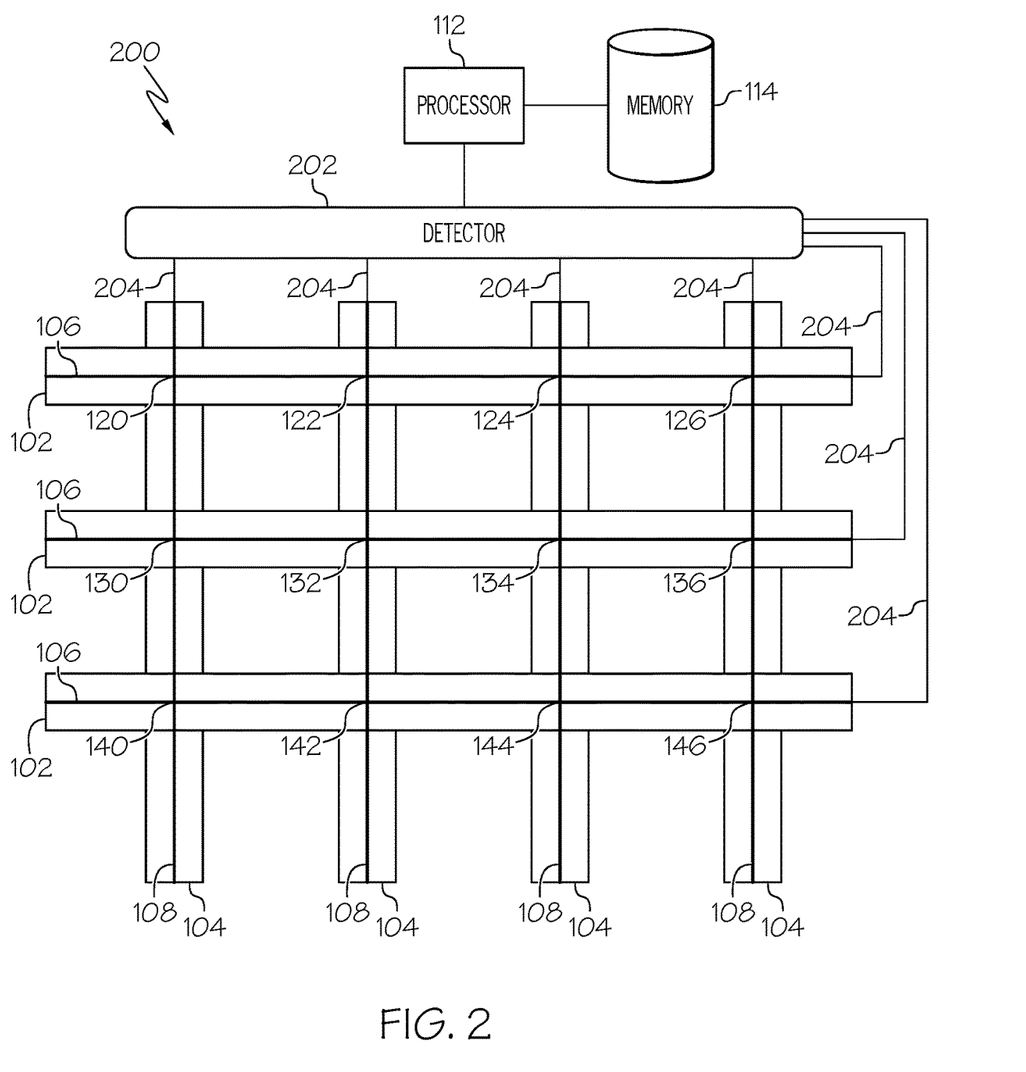
FIG. 2 schematically depicts another example object detection apparatus according to one or more embodiments shown or described herein.

Referring now to FIG. 2, another example object detection apparatus 200 is shown. The object detection apparatus 200 of FIG. 2 is constructed in a similar manner to the object detection apparatus 100 of FIG. 1 except that the object detection apparatus 200 does not include the optical routers 116, 118. Instead, the horizontal and vertical optical fibers 106, 108 are connected to a detector 202 via additional optical fibers or other light guides 204 to optically couple the optical fibers to the detector. The detector 202 is constructed in a similar manner as the detector 110 and may determine amplitudes of optical signals received from each of the optical fibers 106, 108. The detector 202 may send data regarding these optical signals to the processor 112 in a similar manner as discussed above with respect to FIG. 1 (although not shown). One or more memory modules 114 may be coupled to the processor 112. The processor 112 may thereby determine which pixels of the object detection apparatus 200 were illuminated at any given time. In the example of FIG. 2, the detector 202, the processor 112, and the one or more memory modules 114 are positioned adjacent to the vertical fabric strands 104. However, it should be understood that in other examples, the detector 202, the processor 112, and/or the one or more memory modules 114 may be positioned adjacent to the horizontal fabric strands 102, or in some other positional relationship with respect to the horizontal and vertical fabric strands 102, 104.

Figure 3:
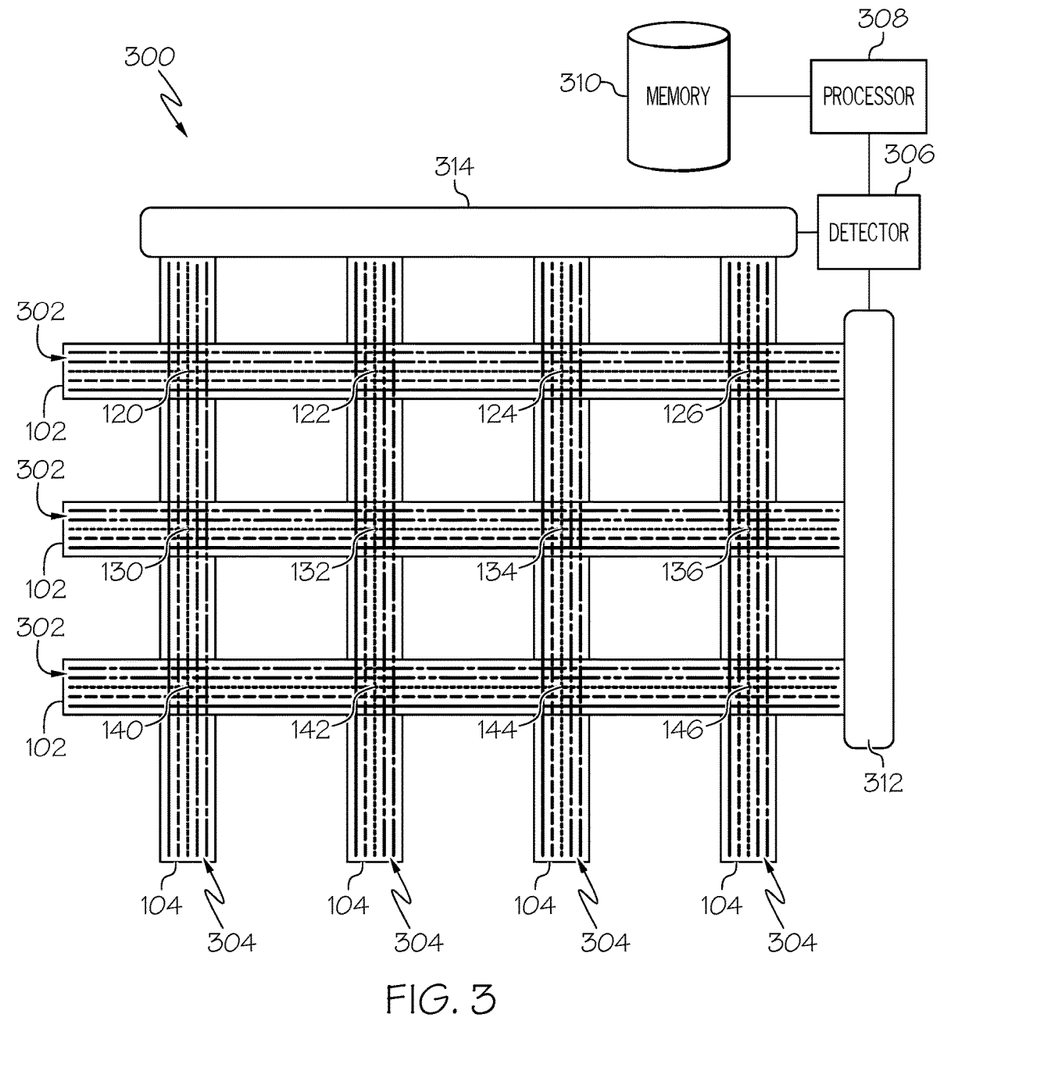
FIG. 3 schematically depicts another example object detection apparatus according to one or more embodiments shown or described herein.

Referring now to FIG. 3, another example object detection apparatus 300 is shown. The object detection apparatus 300 comprises a plurality of horizontal fabric strands 102 and vertical fabric strands 104 constructed in a similar manner as in the object detection apparatus 100 of FIG. 1. The horizontal and vertical fabric strands 102, 104 may be embedded in a carrier fabric as discussed above.

In the example of FIG. 3, the object detection apparatus 300 comprises multiple optical fibers embedded within each of the fabric strands 102, 104. A set of horizontal optical fibers 302 are embedded within the horizontal fabric strands 102 and a set of vertical optical fibers 304 are embedded within the vertical fabric strands 104. In the example of FIG. 3, each set of horizontal optical fibers 302 and each set of vertical optical fibers 304 contain five optical fibers. However, it should be understood that in other examples, the sets of horizontal optical fibers 302 and the sets of vertical optical fibers 304 may contain more or less than five optical fibers.

Figure 5:
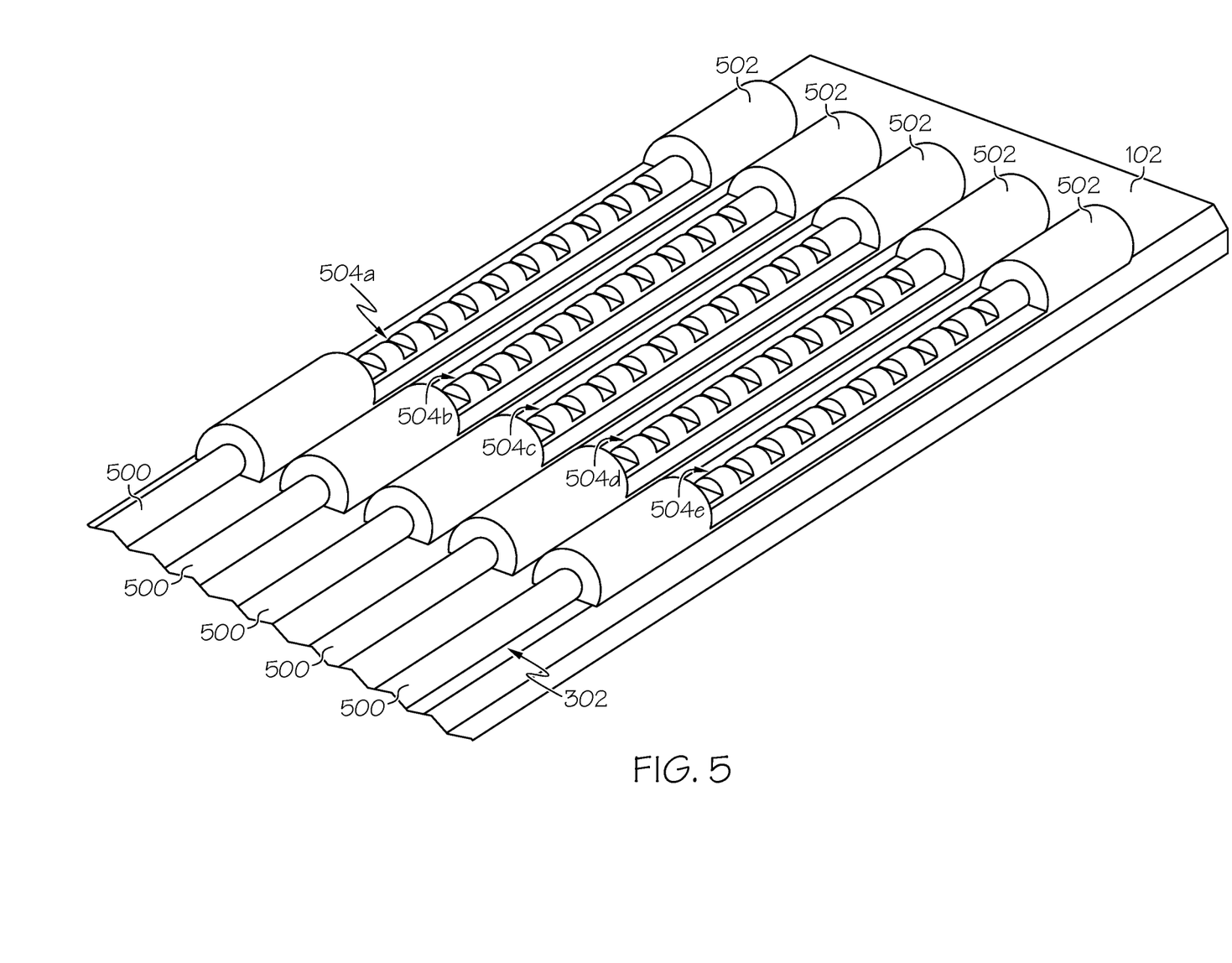
FIG. 5 depicts an example fabric strand of the object detection apparatus of FIG. 3.

Referring now to FIG. 5, a portion of an exemplary horizontal fabric strand 102 and a set of horizontal optical fibers 302 embedded within the horizontal fabric strand 102 of the object detection apparatus 300 is shown. Although FIG. 5 shows an exemplary set of horizontal optical fibers 302, it should be understood that the set of vertical optical fibers 304 may be constructed similarly to the set of horizontal optical fibers 302. In the illustrated example, the set of horizontal optical fibers 302 comprises five optical fibers, each having a fiber core 500 and a fiber cladding 502. The fiber core 500 and the fiber cladding 502 are constructed in a similar manner as the fiber core 400 and the fiber cladding 402 of FIG. 4. For purposes of illustration, only a portion of the fiber cladding 502 of each of the horizontal optical fibers 302 is shown in order to illustrate an interior portion of the horizontal optical fibers 302. However, it should be understood that the fiber cladding 502 may extend over the length of each of the horizontal optical fibers 302 or a continuous portion thereof.

A portion of the fiber core 500 of each optical fiber in the set of horizontal optical fibers 302 may comprise Bragg gratings 504a, 504b, 504c 504d, 504e, respectively. Similar to the Bragg grating 404 of FIG. 4, the Bragg gratings 504a, 504b, 504c 504d, 504e of FIG. 5 may each comprise a region of the fiber core 500 having a periodic variation in refractive index to allow only certain wavelengths to pass through the grating. In the example of FIG. 5, each Bragg grating 504a, 504b, 504c, 504d, 504e is constructed to allow a different wavelength of light to pass through the grating (e.g., a different color). Thus, the object detection apparatus 300 is able to detect different colors of light incident on the apparatus. In other examples, the different Bragg gratings 504a, 504b, 504c, 504d, 504e may be configured to only allow light impinging on the horizontal optical fibers 302 at certain angles of incidence to pass through the gratings.

Referring back to FIG. 3, a detector 306 is optically coupled to a first optical router 312 and a second optical router 314. The first optical router 312 routes optical signals from the horizontal optical fibers 302 to the detector 306 and the second optical router 314 routes optical signals from the vertical optical fibers 304 to the detector 306. In some examples, the object detection apparatus 300 may not have the first and second optical routers 312, 314 and may instead use additional fibers or other light guides to optically couple the optical fibers 106, 108 to the detector 306.

The horizontal and vertical fabric strands 102, 104 define a two-dimensional grid or array of pixels with each pixel being defined by the position where a horizontal fabric strand 102 crosses over or under a vertical fabric strand 104. In the example of FIG. 3, each fabric strand 102, 104 contains multiple optical fibers with different Bragg gratings, as explained above in connection with FIG. 5. Thus, each pixel of the object detection apparatus 300 may receive light at multiple wavelengths and/or angles of incidence. The optical fibers of the object detection apparatus 300 are optically coupled to the detector 306 such that when the detector 306 receives an optical signal from an optical fiber, the detector 306 may determine exactly which optical fiber transmitted the optical signal. The detector may then transmit data regarding the amplitude of optical signals received from the optical fibers 302, 304 to a processor 308. The processor 308 may be constructed similarly to the processor 112 of FIG. 1 and may be coupled to one or more memory modules 310, which may be constructed similarly to the one or more memory modules 114 of FIG. 1. Thus, when the processor 308 receives the optical signal data from the detector 306, the processor 308 may determine which pixels of the object detection apparatus 300 were illuminated to generate the optical signals received by the detector 306. In addition, the processor 308 is able to determine which fiber or fibers of the group of optical fibers 302, 304 transmitted the optical signal to the detector 306, which allows the processor 308 to determine which wavelength of light and/or angle of incident of light illuminated the pixels that generated the optical signals.

Figure 6:
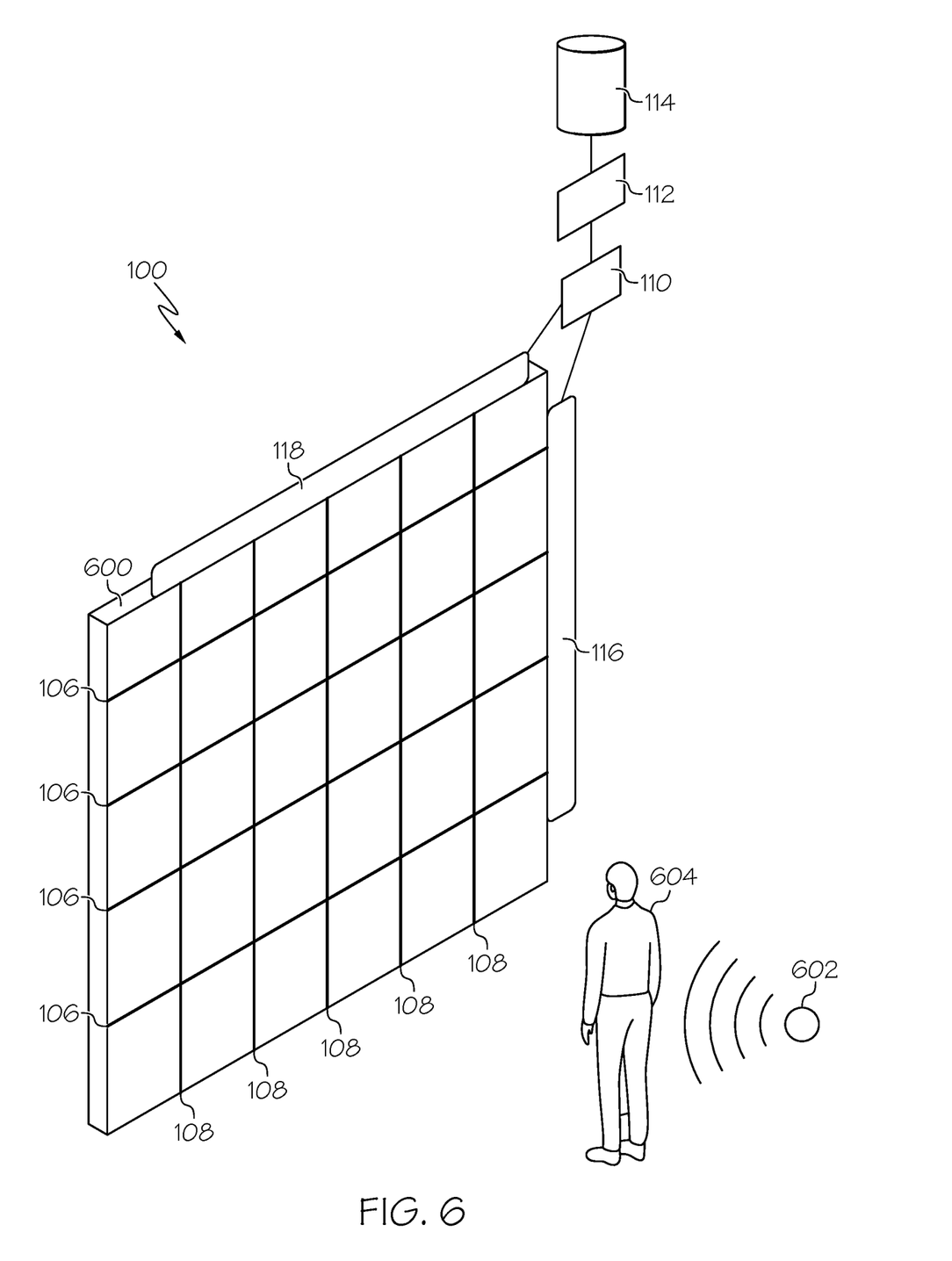
FIG. 6 depicts another view of the object detection apparatus of FIG. 1.

Turning now to FIG. 6, an application of the object detection apparatus of the present disclosure is discussed. In the example of FIG. 6, the object detection apparatus 100 is embedded in a curtain 600. In other examples, the object detection apparatus 200 or the object detection apparatus 300 could be embedded in the curtain 600. In particular, the horizontal and vertical fabric strands 102, 104 (not shown in FIG. 6) are embedded into the curtain 600 and the horizontal and vertical optical fibers 106, 108 are embedded in the horizontal and vertical fabric strands 102, 104, respectively. For purposes of illustration, five horizontal optical fibers 106 and five vertical optical fibers 108 are shown in FIG. 6. However, it should be understood that the curtain 600 may contain any number of optical fibers and will typically contain hundreds or thousands of such optical fibers. In the example of FIG. 6, the optical fibers 106, 108 are spaced across substantially the entire area of the curtain 600. However, in other examples, the optical fibers 106, 108 may be spaced across only a portion of the curtain 600.

In the example of FIG. 6, a light source 602 is positioned some distance away from the curtain 600 and a person 604 is positioned between the light source 602 and the curtain 600. In other examples, the light source 602 may be positioned between the curtain 600 and the person 604. The light source 602 may be an ambient light source (e.g., room lighting, natural lighting) or may be a light source tuned to work with the object detection apparatus 100 (e.g., a light source that emits light at a wavelength that passes through a Bragg grating on the optical fibers 106, 108). In some examples, there may not be an explicit light source, such as the light source 602, which illuminates the object detection apparatus 100. Instead, the object detection apparatus 100 may be illuminated from one or more ambient light sources.

In the example of FIG. 6, the person 604 positioned between the light source 602 and the curtain 600 may block certain pixels of the object detection apparatus 100 from being illuminated by the light source 602 or may diminish the amplitude of emitted light onto certain pixels. Meanwhile, certain other pixels will not be shaded by the person 604 and will be fully illuminated by the light source 602, thereby creating a distinct illumination pattern. Thus, the particular pixels of the object detection apparatus 100 that are illuminated will depend on the size and shape of the person 604. Accordingly, the object detection apparatus 100 may act as a camera as explained herein.

When the light source 602 illuminates certain pixels of the object detection apparatus 100 embedded in the curtain 600 (e.g., pixels that are not blocked or shaded by the person 604 or pixels that are illuminated by light reflected off of the person 604), light from the light source 602 enters those optical fibers and travels along the length of the optical fibers to one of the optical routers 116, 118. The light is then routed to the detector 110, which may detect the amplitude of optical signals received into each of the pixels of the object detection apparatus 100, as explained above. The detector may then transmit data regarding this optical signal information to the processor 112, as discussed above. As such, the processor 112 has a record of each pixel illuminated by the light source 602 when the person 604 is positioned between the light source 602 and the curtain 600. This data may be used to recreate an image of the person 604 (e.g., by plotting an image of each pixel illuminated, which would create a reverse image). However, because there is no lens to focus the light from the light source 602, the resulting image may be quite blurry and unrecognizable to human observers. Accordingly, additional techniques may be used to identify or classify the image, as described in further detail below.

Although an image created directly from the data received by the processor 112 would be unrecognizable to human observers, the data is dependent on the size and shape of the object positioned between the light source 602 and the curtain 600 (e.g., the person 604). Thus, the data received by the processor 112 may be interpreted to identify or reconstruct an image of the object (e.g., identify the object between the light source 602 and the curtain 600 that caused the particular arrangement of pixels to be illuminated on the object detection apparatus 100). One way to interpret the data is to use machine learning, as described below with respect to FIG. 7.

A machine learning algorithm may be trained with training data to tune appropriate parameters of the algorithm to best fit the training data. The trained machine learning algorithm may then be used to make future predictions from unknown data sets. In the present disclosure, training data may comprise pixel data detected by the detector 110 (e.g., amplitudes of illumination of the pixels of the object detection apparatus 100) when a variety of objects are positioned between the light source 602 and the curtain 600, in the example of FIG. 6. That is, each training example may comprise pixel data when a different object is positioned between the light source 602 and the curtain 600. For example, a first training example may comprise the pixel data from a person being positioned between the light source 602 and the curtain 600, a second training example may comprise the pixel data from a dog being positioned between the light source 602 and the curtain 600, and a third training example may comprise the pixel data from a table being positioned between the light source 602 and the curtain 600. In the illustrated example, the one or more memory modules 114 comprise instructions that may be executed by the processor 112 to train and implement the machine learning algorithm described herein. In other examples, one or more separate components may be used to train and/or implement the machine learning algorithm described herein.

Figure 7:
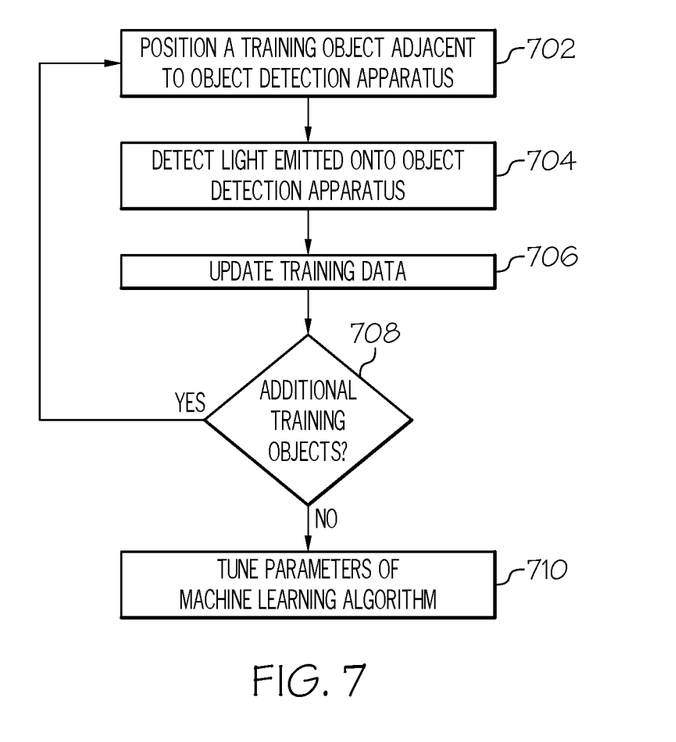
FIG. 7 depicts a flowchart for training a machine learning algorithm associated with the disclosed object detection algorithm to identify objects adjacent to the object detection apparatus.

FIG. 7 depicts a flowchart for training a machine learning algorithm to be used by the object detection apparatus 100 to identify objects. At step 702, a training object is positioned adjacent to the object detection apparatus 100. In the example of FIG. 6, the training object may be placed between the curtain 600 and the light source 602. When the training object is positioned adjacent to the object detection apparatus 100, the amplitude and pattern of illumination of the pixels of the object detection apparatus will change depending on the size and/or shape of the training object. A training example for the machine learning algorithm comprises a list of the amplitudes and patterns of illumination of the pixels along with an image or identification of the training object.

At step 704, the detector 110 detects the amplitude and pattern at which the optical fibers of the object detection apparatus 100 are illuminated at a specific time when the training object is positioned adjacent to the object detection apparatus. The detector 110 may then transmit this data to the processor 112, which may determine the intensity light received by each of the pixels of the object detection apparatus 100. As explained above, the specific pixels illuminated will depend on characteristics of the training object. At step 706, the data regarding the intensity of illumination of each of the optical fibers of the object detection apparatus 100 is added to training data for the machine learning algorithm as one training example. In addition to the data regarding optical fiber illumination, for each training example, a labeled image or identification of the training object is also included. This allows the machine learning algorithm to learn which images of training objects create which patterns of pixel illumination.

At step 708, it is determined whether the machine learning algorithm is to be trained with additional training objects.

Any number of training objects may be used to create any number of training examples. However, the more training examples are created, the better the more accurate the machine learning algorithm will be at identifying objects. If, at step 708, there are additional training objects, then control returns to step 702 and a new training object may be positioned adjacent to the object detection apparatus. If, at step 708, there are not any additional training objects, then, at step 710, the training data is used to train the machine learning algorithm by tuning its parameters based on the training data.

The machine learning algorithm may be trained to receive input data (e.g., an amplitude of illumination of each pixel of the object detection apparatus 100 at a given time) and predict an image or identity of an object positioned adjacent to the object detection apparatus 100. Thus, the machine learning algorithm may be trained by tuning its parameters such that applying the trained machine learning algorithm to the each training example produces an output prediction that most closely matches the images or object identities associated with each training example (e.g., by minimizing a cost function over the entire training data set).

Once the machine learning algorithm is trained, the machine learning algorithm may be used to predict in real-time an image or identity of an object positioned in front of or adjacent to the object detection apparatus 100. The detector 110 may detect the amplitudes of optical signals received from the optical fibers of the object detection apparatus and the processor may determine the intensity of illumination of each pixel of the object detection apparatus 100 when an object is positioned in front of the object detection apparatus 100. This data may then be input to the trained machine learning algorithm stored on the one or more memory modules 114, and the processor may implement the machine learning algorithm to predict an image or identification of the object. This may be used in a variety of application, discussed in further detail below.

In one application, the object detection apparatus 100 may be embedded in a curtain in a window of a home. The object detection apparatus 100 may then detect objects that pass in front of the curtain. As such, the object detection apparatus 100 may allow the curtain to function as a security camera.

In another example, the object detection apparatus 100 may be embedded in a fabric or trim of a vehicle, such as in the interior vehicle ceiling (i.e., the headliner). In this example, the object detection apparatus 100 may detect objects or passengers in the vehicle. In one example, the machine learning algorithm associated with the object detection apparatus may be trained to identify different postures or body positions of a driver, such as when the driver is injured, suffering a serious medical emergency, or otherwise in distress. In this example, if the object detection apparatus 100 determines that the driver has a body posture indicating that the driver is injured or in need of medical attention, for example after a car crash has occurred, the appropriate authorities may be automatically contacted and requested to assist the driver.

As discussed above, in some examples, the object detection apparatus 100 may have a Bragg grating 404 to only allow certain wavelengths of light to enter the optical fibers 106, 108. In some examples, this may be used in conjunction with a light source that emits light at a particular wavelength that passes through the Bragg grating 404. For example, the object detection apparatus 100 may have a Bragg grating 404 that only allows infrared light to pass through and enter the optical fibers 106, 108. This example object detection apparatus 100 may be used in conjunction with an infrared light source such that the object detection apparatus 100 may detect objects in the dark when there is no ambient light source available.

It should now be understood that embodiments described herein provide for an object detection apparatus comprising a plurality of fabric strands embedded in a carrier fabric and a plurality of optical fibers embedded in the fabric strands. A first set of optical fibers may be oriented transverse to a second set of optical fibers to create a two-dimensional array of pixels. A detector may detect light that illuminates one or more optical fibers and a processor may determine one or more pixels illuminated. A machine learning algorithm may be trained to identify objects adjacent to the object detection apparatus based on the particular pixels illuminated when the object is so present.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. In particular, in any examples discussed above that refer to the use of the object detection apparatus 100, the object detection apparatus 200 or 300 may be used instead. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An object detection apparatus comprising:
   a first plurality of optical fibers embedded in a first plurality of fabric strands, wherein the first plurality of optical fibers comprise an inner core and an outer cladding positioned around the core, wherein the first plurality of optical fibers are positioned adjacent to each other and oriented along a first direction and are configured to receive ambient light impinging onto an outer surface of one or more of the first plurality of optical fibers;
   a second plurality of optical fibers embedded in a second plurality of fabric strands, wherein the second plurality of optical fibers comprise an inner core and an outer cladding positioned around the core, and wherein the second plurality of optical fibers are positioned adjacent to each other and oriented along a second direction transverse to the first direction and are configured to receive ambient light impinging onto an outer surface of one or more of the second plurality of optical fibers; and
   a detector configured to:
   detect the light received into at least some of the first plurality of optical fibers and into at least some of the second plurality of optical fibers;
   create training data to be processed to identify an object adjacent to the object detection apparatus, wherein the training data is based on the light received into the first plurality of optical fibers and the light received into the second plurality of optical fibers; and
   train a machine learning model to recreate an image of the object based on the training data.

2. The object detection apparatus of claim 1, wherein the first plurality of optical fibers and the second plurality of optical fibers are optically coupled to the detector.

3. The object detection apparatus of claim 1;
wherein the first plurality of optical fibers and the second plurality of optical fibers define a two-dimensional grid of pixels at points where one of the first plurality of optical fibers crosses one of the second plurality of optical fibers; and
wherein the detector detects light emitted onto each pixel of the grid of pixels and the data is based on the light emitted onto each pixel.

4. The object detection apparatus of claim 1, wherein a portion of at least one of the first plurality of optical fibers and a portion of at least one of the second plurality of optical fibers comprise a grating.

5. The object detection apparatus of claim 4, wherein the grating of the at least one of the first plurality of optical fibers or the at least one of the second plurality of optical fibers is configured such that the at least one of the first plurality of optical fibers or the at least one of the second plurality of optical fibers only receive light having a wavelength within a predetermined range of wavelengths.

6. The object detection apparatus of claim 4, wherein the grating of the at least one of the first plurality of optical fibers or the at least one of the second plurality of optical fibers is configured such that the at least one of the first plurality of optical fibers or the at least one of the second plurality of optical fibers only receive light having an angle of incidence within a predetermined range of angles of incidence.

7. The object detection apparatus of claim 1, wherein a first set of optical fibers are embedded in at least one of the first plurality of fabric strands.

8. The object detection apparatus of claim 7, wherein a portion of a first fiber of the first set of optical fibers comprises a first grating configured such that the first fiber of the first set of optical fibers receives light having a first wavelength and a portion of a second fiber of the first set of optical fibers comprises a second grating configured such that the second fiber of the first set of optical fibers receives light having a second wavelength.

9. A system comprising the object detection apparatus of claim 1 and a light source positioned adjacent to the object detection apparatus such that when the object is positioned between the light source and the object detection apparatus, light emitted by the light source will be partially blocked by the object such that the light will illuminate a first subset of the first plurality of optical fibers and the second plurality of optical fibers and will not illuminate a second subset of the first plurality of optical fibers and the second plurality of optical fibers.

10. The system of claim 9, wherein the light source emits light at a first wavelength and at least one of the first plurality of optical fibers and at least one of the second plurality of optical fibers are configured to receive light at the first wavelength.

11. The system of claim 10, wherein the light source emits infrared light.

12. An object detection apparatus comprising:
a first plurality of optical fibers embedded in a first plurality of fabric strands, wherein the first plurality of optical fibers comprise an inner core and an outer cladding positioned around the core, wherein the first plurality of optical fibers are positioned adjacent to each other and oriented along a first direction and are configured to receive ambient light impinging onto an outer surface of one or more of the first plurality of optical fibers;
a second plurality of optical fibers embedded in a second plurality of fabric strands, wherein the second plurality of optical fibers comprise an inner core and an outer cladding positioned around the core, and wherein the second plurality of optical fibers are positioned adjacent to each other and oriented along a second direction transverse to the first direction and are configured to receive ambient light impinging onto an outer surface of one or more of the second plurality of optical fibers;
a detector configured to detect the light received into at least some of the first plurality of optical fibers and into at least some of the second plurality of optical fibers;
a processor;
one or more memory modules; and
machine readable instructions stored in the one or more memory modules that; when executed by the processor, cause the processor to:
create training data to be processed to identify an object adjacent to the object detection apparatus based on the light received into the first plurality of optical fibers and the light received into the second plurality of optical fibers; and
train a machine learning model to recreate an image of the object based on the training data.

13. The object detection apparatus of claim 12, wherein the machine readable instructions stored in the one or more memory modules, when executed by the processor, cause the processor to identify one or more characteristics of the object based on the light emitted onto the first plurality of optical fibers and the second plurality of optical fibers.

14. A vehicle comprising:
a first plurality of optical fibers embedded in a surface of the vehicle, wherein the first plurality of optical fibers comprise an inner core and an outer cladding positioned around the core, wherein the first plurality of optical fibers are positioned adjacent to each other and oriented along a first direction and are configured to receive ambient light impinging onto an outer surface of one or more of the first plurality of optical fibers;
a second plurality of optical fibers embedded in the surface of the vehicle, wherein the second plurality of optical fibers comprise an inner core and an outer cladding positioned around the core, and wherein the second plurality of optical fibers are positioned adjacent to each other and oriented along a second direction transverse to the first direction and are configured to receive ambient light impinging onto an outer surface of one or more of the second plurality of optical fibers;
a detector to detect the light received into at least some of the first plurality of optical fibers and into at least some of the second plurality of optical fibers;
a processor;
one or more memory modules; and
machine readable instructions stored in the one or more memory modules that, when executed by the processor, cause the processor to:
create training data to be processed to identify an object within the vehicle based on the light received into the first plurality of optical fibers and the light received into the second plurality of optical fibers; and
train a machine learning model to recreate an image of the object based on the training data.

15. The vehicle of claim 14, wherein the first plurality of optical fibers and the second plurality of optical fibers are embedded in headliner of the vehicle.

16. The vehicle of claim 14, wherein the machine readable instructions stored in the one or more memory modules, when executed, cause the processor to identify a posture of a driver of the vehicle based on the light received into the first plurality of optical fibers and the light received into the second plurality optical fibers.

17. The vehicle of claim 16, wherein the machine readable instructions stored in the one or more memory modules, when executed, cause the processor to determine whether the driver of the vehicle is in distress based on the posture of the driver.

* * * * *

UNITED STATES PATENT AND TRADEMARK OFFICE
CERTIFICATE OF CORRECTION

PATENT NO. : 11,773,518 B2
APPLICATION NO. : 16/778838
DATED : October 3, 2023
INVENTOR(S) : Paul Schmalenberg and Ercan M. Dede Page 1 of 1

It is certified that error appears in the above-identified patent and that said Letters Patent is hereby corrected as shown below:

In the Claims

In Column 13, Line(s) 4, Claim 3, after "claim 1", delete ";" and insert --,--, therefor.

In Column 14, Line(s) 20, Claim 12, after "that", delete ";" and insert --,--, therefor.

Signed and Sealed this
Twenty-eighth Day of November, 2023

Katherine Kelly Vidal
*Director of the United States Patent and Trademark Office*